US007827340B2

(12) United States Patent
Solomon

(10) Patent No.: US 7,827,340 B2
(45) Date of Patent: Nov. 2, 2010

(54) GRAPHICS PROCESSOR IN A DOCKING STATION

(75) Inventor: Mark C. Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 11/831,177

(22) Filed: Jul. 31, 2007

(65) Prior Publication Data
US 2009/0037633 A1    Feb. 5, 2009

(51) Int. Cl.
G06F 13/00    (2006.01)
(52) U.S. Cl. .................... 710/303; 710/48; 710/72; 710/300; 710/314; 345/501; 345/905
(58) Field of Classification Search ................. 710/303, 710/48, 72, 300, 314; 361/681; 345/501, 345/905
See application file for complete search history.

(56) References Cited

U.S. PATENT DOCUMENTS

| | | | |
|---|---|---|---|
| 6,362,959 B2 * | 3/2002 | Tracy ........................ 361/687 |
| 6,772,265 B2 * | 8/2004 | Baweja et al. ............... 710/303 |
| 6,860,609 B2 * | 3/2005 | Olson et al. ................ 353/122 |
| 7,038,906 B2 * | 5/2006 | Hubbard ................ 361/679.09 |
| 7,079,149 B2 * | 7/2006 | Main et al. .................. 345/520 |
| 7,123,880 B2 * | 10/2006 | Kakemura ................. 455/41.2 |
| 7,180,475 B2 * | 2/2007 | Slobodin et al. ............. 345/2.3 |
| 7,327,385 B2 * | 2/2008 | Yamaguchi .............. 348/207.1 |
| 7,350,923 B2 * | 4/2008 | Olson et al. .................... 353/30 |
| 7,478,187 B2 * | 1/2009 | Knepper et al. ............. 710/300 |
| 7,486,946 B2 * | 2/2009 | Shinozaki .................... 455/410 |
| 2003/0017846 A1 * | 1/2003 | Estevez et al. .............. 455/556 |
| 2003/0218577 A1 * | 11/2003 | Wang ......................... 345/1.3 |
| 2004/0010805 A1 * | 1/2004 | Dvir et al. ................... 725/136 |
| 2004/0267981 A1 * | 12/2004 | Kakemura .................... 710/48 |
| 2005/0246470 A1 * | 11/2005 | Brenner ...................... 710/303 |
| 2006/0010268 A1 * | 1/2006 | Garland ........................ 710/72 |
| 2006/0282604 A1 * | 12/2006 | Temkine et al. ............. 710/314 |
| 2007/0006269 A1 * | 1/2007 | Huang et al. .................. 725/81 |
| 2007/0086154 A1 * | 4/2007 | Koch ........................... 361/681 |
| 2008/0269927 A1 * | 10/2008 | Szolyga et al. ................ 700/94 |

OTHER PUBLICATIONS

ASUS. ASUS XG Station Empowers Upgradeable Graphics Power for Notebook Computers. http://www.asus.com/news_show.aspx?id=5369. Jan. 6, 2007.*
ASUS. XG-Station Quick Installation Guide. First Edition. Jan. 2008.*
What Laptop. Laptop Gamer. Jun. 2007.*
DisplayLink Corp. Monitors Made Easy with USB. 2007.*

(Continued)

*Primary Examiner*—Mark Rinehart
*Assistant Examiner*—Matthew D Spittle

(57) ABSTRACT

A system that includes a docking station comprising a graphics processor and a transceiver. The system also includes a computer comprising a display. The computer is in communication with the docking station. The graphics processor receives input signals from the computer and, as a result, provides output signals to the computer. The computer uses the output signals to display images on the display.

17 Claims, 2 Drawing Sheets

OTHER PUBLICATIONS

NEC Technologies, Inc. NEC Versa series Docking Station 6000 User's Guide. Jul. 1996.*

"ASUSXG Station world's first external graphics card station for notebook computer"; FarEastGizmos.com online catalog; copyright 2005; 5 pp; http://www.fareastgizmos.com/computing/asus_xg_station.

"Kensington 60702 Notebook Expansion Dock with Adjustable Base (PC)"; Amazon.com online catalog; copyright 1996-2007; 7 pp; http://www.amazon.com/Kensington -60702- Notebook_Expansion.

* cited by examiner

US 7,827,340 B2

GRAPHICS PROCESSOR IN A DOCKING STATION

BACKGROUND

Portable computers, such as laptop and notebook computers, often are used for processor-intensive applications, such as gaming, video editing, etc. Such portable computers often contain processors (e.g., graphics processors) whose processing capabilities may be less than desirable for such processor-intensive applications.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Also, the term "portable computer" refers to computers such as laptop computers and notebook computers.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are various embodiments of a docking station which enables a computer (e.g., a portable computer such as a laptop or notebook computer) to use the docking station's graphics processor in lieu of the computer's own graphics processor. The docking station's graphics processor may be more powerful than the computer's graphics processor. As a result, processor-intensive applications (e.g., gaming applications) that are run on the docking station's graphics processor may benefit from that processor's superior capabilities.

Figure 1:
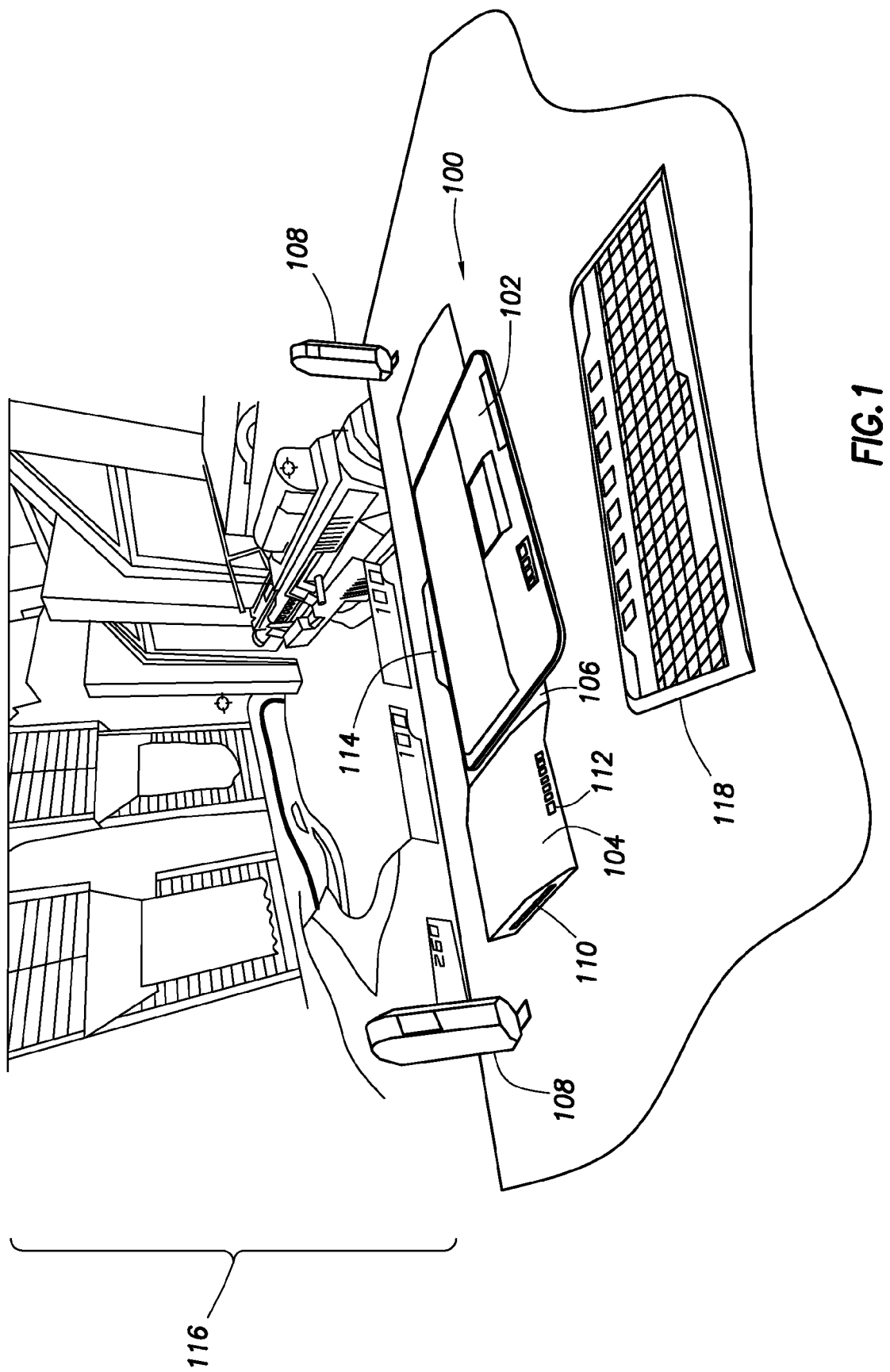
FIG. 1 shows an illustrative docking station and portable computer implementing the techniques disclosed herein, in accordance with various embodiments.

FIG. 1 shows an illustrative system 100 comprising a computer (e.g., a portable computer such as a laptop computer or notebook computer) 102 resting on a docking station 104. The computer 102 communicates (e.g., wired or wirelessly) with the docking station 104. A graphics processor in the docking station 104 may be more powerful than a similar processor in the computer 102. As such, when executing software, the computer 102 may "detour" data signals to the graphics processor in the docking station 104 instead of providing the signals to the graphics processor of the computer 102. In turn, the graphics processor in the docking station 104 may provide output signals to the computer 102 for display on the computer 102. Alternatively, the graphics processor in the docking station 104 may provide some of the output signals to the computer 102 and may retain some of the output signals for display on the docking station 104. Any and all such variations are encompassed within the scope of this disclosure. Although this disclosure primarily describes embodiments in terms of graphics processors, other circuit logic also may be used.

The docking station 104 also may comprise various other features, such as a heat sink 106 upon which the computer 102 rests. The heat sink 106 removes heat from the computer 102. The docking station 104 may comprise a media drive (e.g., a compact disc (CD) or digital video disc (DVD) drive) 110 which may be used independently of the computer 102 to play audio CDs, DVD movies, games, etc. The docking station 104 also comprises a display 112 (e.g., a liquid crystal display), described further below. The docking station 104 may comprise a projection apparatus 114. The projection apparatus 114 receives video signals from a graphics processor contained inside the docking station 104, as described below. Using the video signals, the projection apparatus 114 projects images onto a screen or other suitable surface. One such illustrative image 116 is shown. The docking station 104 and/or the computer 102 may interact with various peripheral devices, such as speakers 108, keyboard 118, etc. In at least some embodiments, such peripheral devices interact with the docking station 104 and/or the computer 102 using wireless communications.

Figure 2:
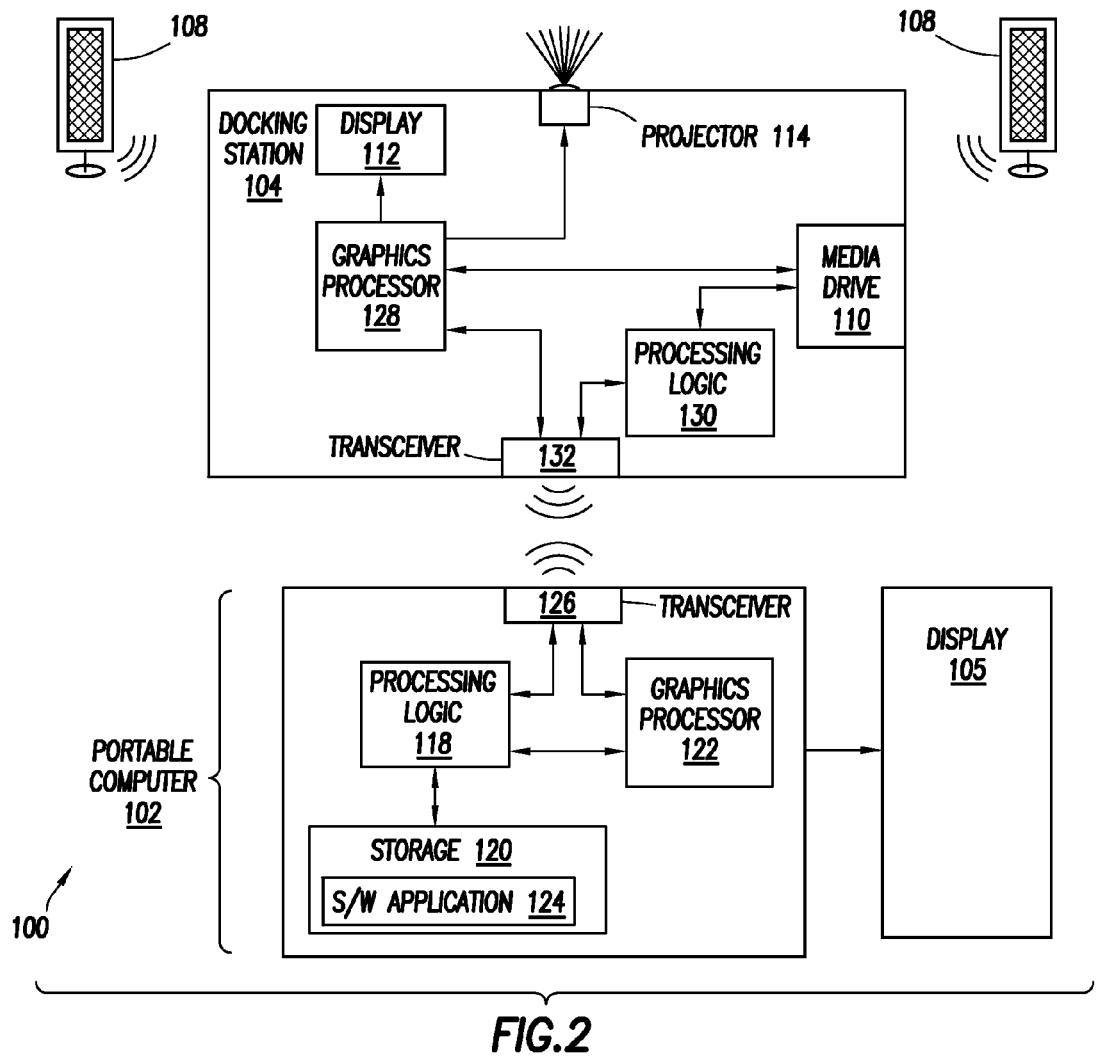
FIG. 2 shows an illustrative block diagram of the docking station and computer of FIG. 1, in accordance with various embodiments.

FIG. 2 shows an illustrative block diagram of circuit logic associated with the system 100. In particular, the system 100 comprises the computer 102 and the docking station 104. The computer 102 comprises a processing logic 118, storage 120 and a graphics processor 122. The storage 120 may comprise a processor (computer)-readable medium such as random access memory (RAM), volatile storage such as read-only memory (ROM), a hard drive, flash memory, etc. or combinations thereof. The storage 120 comprises software application 124. In at least some embodiments, the software application 124 may comprise a processor-intensive application, such as gaming or video-editing software. The computer 102 also comprises a transceiver 126. The transceiver 126 is capable of transmitting and receiving data signals. In some embodiments, the transceiver 126 is capable of transmitting and receiving data signals wirelessly. In at least some such embodiments, the transceiver 126 transmits and receives signals using ultra wide band (UWB) communications. For example, the transceiver 126 may transmit data to and receive data from the docking station 104 (described below) using UWB techniques. The computer 102 also comprises a display 105.

In the embodiment of FIG. 2, the docking station 104 comprises a graphics processor 128, a processing logic 130, a transceiver 132, wireless speakers 108, a media drive 110, a display 112 and a projector 114. The transceiver 132 transmits data to and receives data from the transceiver 126 using any suitable technique, such as UWB techniques. The media drive 110, in tandem with the processing logic 130, is capable of retrieving data from media storage devices housed in the media drive 110 and may output that data in video and/or audio format. For example, the processing logic 130 may obtain video and audio data from a DVD movie in the media drive 110 and play the movie using display 112/projector 114 and speakers 108.

The graphics processor 128 receives data from and provides data to the transceiver 132. The graphics processor 128 is capable of displaying video on display 112 and/or projector 114. In at least some embodiments, the graphics processor 128 (in the docking station 104) is more powerful than the graphics processor 122 (in the computer 102). For example, the graphics processor 128 of the docking station may operate at a higher frequency than the graphics processor 122 of the computer. For this reason, it may be desirable that the graphics processor 128 of the docking station execute at least some of the software application 124 in lieu of the graphics processor 122 of the computer. Accordingly, while executing the software application 124, the processing logic 118 may provide at least some data signals to the transceiver 126 for transmission (e.g., UWB transmission) to the graphics processor 128 via transceiver 132. In turn, the graphics processor 128 receives the input signals from the transceiver 132, executes the signals, and provides resulting output signals to the transceiver 132 for transmission to the computer 102. The computer 102 receives the output signals and uses the output signals to display images on the display 105.

In some embodiments, instead of transmitting the output signals to the computer 102, the graphics processor 128 may transfer the output signals to one or both of the display 112 and the projector 114. In some embodiments, the graphics processor 128 may selectively transfer some of the output signals to the display 112, and some of the output signals to the projector 114. In yet other embodiments, the graphics processor 128 may selectively transfer some of the output signals to the display 112 and some of the output signals to the display 105 of the computer 102. For example, in many gaming applications, the display is often cluttered with information (e.g., amount of ammunition remaining, amount of time remaining, amount of fuel remaining) that may be useful to the player. However, especially on relatively small displays (such as those of portable computers), this information hinders game play because it consumes an excessive amount of space on the display and makes it difficult for the player to see the "game action" in which the player is participating. Accordingly, the docking station's graphics processor 128 may selectively relegate such information for display on the display 112 and may display the game action on the display 105 or using the projector 114. In still other embodiments, the graphics processor 128 may selectively transfer some of the output signals to the display 114 and some of the output signals to the display 105. A user of the system 100 may configure which displays are used by way of a utility program (not specifically shown).

Figure 3:
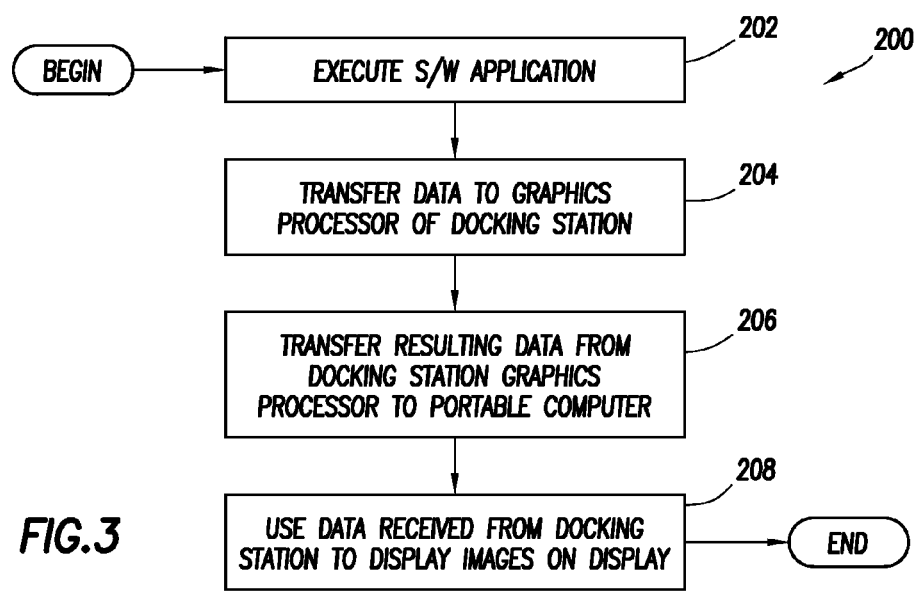
FIG. 3 shows a flow diagram of an illustrative method implemented in accordance with various embodiments.

FIG. 3 shows an illustrative flow diagram of a method 200 in accordance with various embodiments. The method 200 begins by executing a software application (block 202). As explained above, this software application may be a processor-intensive application, such as a video-editing or gaming application. The method 200 continues by transferring data to the graphics processor of the docking station (block 204). The graphics processor processes the data and produces output data, which is transferred from the docking station graphics processor to the portable computer (block 206). The data received from the docking station is then used to display images on the display (block 208).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a docking station comprising a graphics processor and a transceiver;
   a computer comprising a display, said computer in communication with the docking station; and
   another display that couples to said docking station;
   wherein the graphics processor in the docking station receives input signals from the computer and, as a result, generates output signals;
   wherein the graphics processor selectively transfers some of said output signals to the computer's display and some of said output signals to said another display based on the information represented by said output signals.

2. The system of claim 1, wherein said communication comprises ultra wide band (UWB) communication.

3. The system of claim 1, wherein said communication comprises wireless communication.

4. The system of claim 1, wherein said computer comprises a portable computer.

5. The system of claim 1, wherein the docking station comprises a heat pad which dissipates heat from the computer.

6. The system of claim 1, wherein the docking station comprises multiple speakers, and wherein at least some of said input signals or output signals are provided to the speakers such that audible sound is produced from the speakers.

7. The system of claim 1, wherein the docking station comprises a projector, and wherein the graphics processor selectively transfers some of said output signals to the projector.

8. The system of claim 1, wherein the docking station is adapted to house and play one or more media storage devices.

9. A docking station, comprising:
   a graphics processor;
   a transceiver adapted to receive input signals from a portable computer; and
   a speaker, wherein the docking station provides audio signals to the speaker via wireless communication, and wherein the speaker receives the audio signals and, as a result, outputs audible sound;
   wherein the docking station provides said input signals to the graphics processor and, as a result, the graphics processor generates output graphics signals;
   wherein the docking station is adapted to provide the output graphics signals to the portable computer and another display.

10. The docking station of claim 9, wherein the docking station is adapted to provide the output graphics signals to the portable computer for display on a portable computer display.

11. The docking station of claim 9 further comprising a projection apparatus, and wherein the docking station uses at least some of the output graphics signals to display images via the projection apparatus.

12. The docking station of claim 9, wherein the transceiver is adapted to communicate with the portable computer using ultra wide band (UWB) wireless communications.

13. A method, comprising:
  receiving input data from a portable computer to a processor in a docking station;
  wirelessly transferring output data from the processor to the portable computer as a result of receiving said input data;
  transferring output data from the processor to another display as a result of receiving said input data; and
  using said output data to display images on a display of the portable computer and said another display.

14. The method of claim 13, wherein receiving input data and transferring output data comprise using an ultra wide band (UWB) wireless communication technique.

15. The method of claim 13 further comprising displaying images using a projection apparatus and using at least some of the output data.

16. A system, comprising:
  means for receiving input data from a portable computer to a processor in a docking station, said means for receiving is also for wirelessly transferring output data from the processor to the portable computer as a result of receiving said input data; and
  means for using said output data to display images on a display of said portable computer and at least one other display.

17. The system of claim 16, wherein the means for receiving uses ultra wide band (UWB) communication techniques.

\* \* \* \* \*